US010050686B2

(12) United States Patent
Vook et al.

(10) Patent No.: US 10,050,686 B2
(45) Date of Patent: Aug. 14, 2018

(54) METHODS AND APPARATUS FOR BEAMFORMING

(75) Inventors: Frederick Vook, Schaumburg, IL (US); Amitabha Ghosh, Buffalo Grove, IL (US); Timothy Thomas, Palatine, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/424,121

(22) PCT Filed: Aug. 31, 2012

(86) PCT No.: PCT/US2012/053293
§ 371 (c)(1),
(2), (4) Date: Feb. 27, 2015

(87) PCT Pub. No.: WO2014/035412
PCT Pub. Date: Mar. 6, 2014

(65) Prior Publication Data
US 2015/0229375 A1    Aug. 13, 2015

(51) Int. Cl.
*H04B 7/04*    (2017.01)
*H04B 7/0456*    (2017.01)
(Continued)

(52) U.S. Cl.
CPC ......... *H04B 7/0469* (2013.01); *H04B 7/0617* (2013.01); *H04L 5/0014* (2013.01); *H04W 72/046* (2013.01); *H04W 72/085* (2013.01); *H04B 7/0632* (2013.01); *H04B 7/0639* (2013.01); *H04B 7/10* (2013.01)

(58) Field of Classification Search
CPC .......... H04B 7/00; H04B 7/0469; H04B 7/04; H04Q 3/24; H04W 16/28; H04W 72/046; H04W 72/085
See application file for complete search history.

(56) References Cited

U.S. PATENT DOCUMENTS 6,016,123 A    1/2000    Barton et al. ................. 342/373
8,619,894 B1   12/2013   Thomas et al. ............... 375/267
(Continued)

OTHER PUBLICATIONS

Annotated document having a photograph showing that vertical sub-elements per polarization were steered to form a desired vertical pattern, with vertical sub-elements each having +/− 45 degree polarization, were known in existing antenna panels at least as early as Jun. 6, 2012.

*Primary Examiner* — Warner Wong
(74) *Attorney, Agent, or Firm* — Harrington & Smith

(57) ABSTRACT

Systems and techniques for carrier aggregated beamforming using elevation control. A base station determines a first elevation to be used for transmission to a user device using a first carrier, for example, based on information received from the user device. A second elevation, for transmission to the user device based on the second carrier, is determined based at least in part on the elevation information determined for the first carrier. The first and second carriers may be used by the same base station or by different base stations, and using elevation information determined for the first carrier to determine elevation information for the second carrier avoids computation and signaling needed for separate determination of the elevation information for the second carrier.

22 Claims, 12 Drawing Sheets

(51) Int. Cl.
*H04B 7/06* (2006.01)
*H04L 5/00* (2006.01)
*H04W 72/04* (2009.01)
*H04W 72/08* (2009.01)
*H04B 7/10* (2017.01)

(56) References Cited

U.S. PATENT DOCUMENTS

| | | |
|---|---|---|
| 9,059,878 B2 | 6/2015 | Thomas et al. |
| 9,161,241 B2 | 10/2015 | Thomas et al. |
| 9,590,709 B2 | 3/2017 | Thomas et al. |
| 2004/0048635 A1 | 3/2004 | Goldberg ............... 455/562.1 |
| 2004/0229652 A1* | 11/2004 | Goldberg ............ H01Q 1/125 455/562.1 |
| 2004/0229653 A1* | 11/2004 | Chotkowski ......... H01Q 1/125 455/562.1 |
| 2005/0020311 A1* | 1/2005 | Goldberg ............ H01Q 1/125 455/562.1 |
| 2009/0143073 A1 | 6/2009 | Hovers et al. ............ 455/452.2 |
| 2009/0325626 A1 | 12/2009 | Palanki et al. |
| 2010/0135238 A1 | 6/2010 | Sadri et al. |
| 2010/0172430 A1 | 7/2010 | Melzer et al. ................ 375/267 |
| 2011/0064156 A1 | 3/2011 | Kim et al. .................... 375/267 |
| 2011/0194638 A1 | 8/2011 | Erell et al. ................... 375/267 |
| 2012/0039251 A1 | 2/2012 | Sayana et al. ................ 370/328 |
| 2012/0140801 A1 | 6/2012 | Asplund et al. .............. 375/219 |
| 2012/0213096 A1* | 8/2012 | Krishnamurthy ....... H04L 5/001 370/252 |
| 2012/0219042 A1 | 8/2012 | Onggosanusi et al. |
| 2012/0314792 A1 | 12/2012 | Tesanovic et al. ........... 375/267 |
| 2013/0003789 A1 | 1/2013 | Eom et al. ................... 375/219 |
| 2013/0058205 A1 | 3/2013 | Tang ............................ 370/203 |
| 2013/0182794 A1 | 7/2013 | Ringstrom et al. ........... 375/297 |
| 2014/0098689 A1* | 4/2014 | Lee ....................... H04B 7/0469 370/252 |
| 2015/0078472 A1 | 3/2015 | Vook et al. |
| 2015/0207547 A1* | 7/2015 | Ko ....................... H04B 7/0456 370/252 |

* cited by examiner

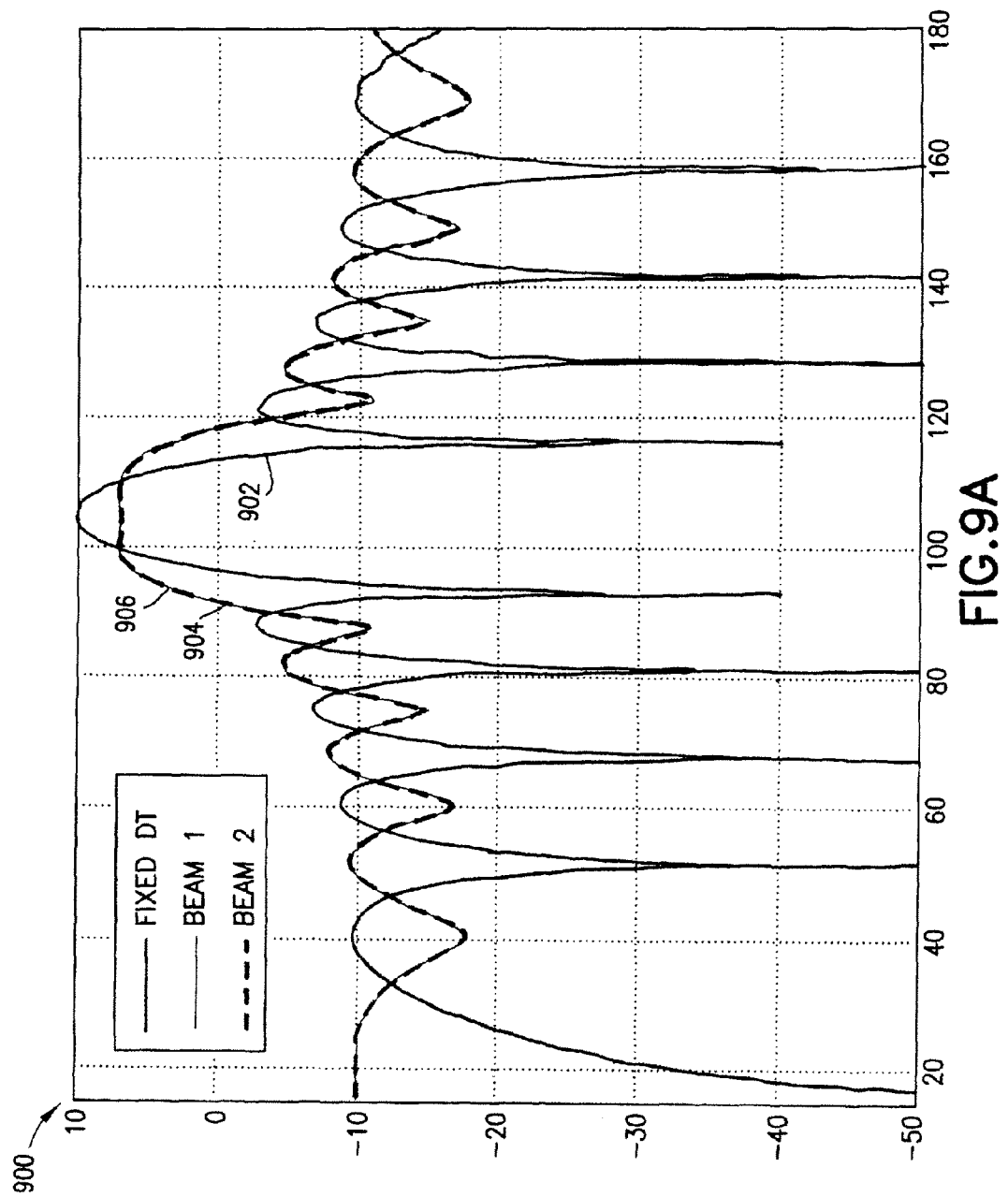

METHODS AND APPARATUS FOR BEAMFORMING

TECHNICAL FIELD

The present invention relates generally to telecommunications. More particularly, the invention relates to systems and techniques for elevation beamforming and carrier aggregation.

BACKGROUND

Modern cellular communication networks typically support numerous user devices, all of which are competing for limited communication resources. Communication service providers face the constant challenge of serving their many customers, many of whose activities consume significant resources, with the infrastructure and communication spectrum available to them. Adding infrastructure to meet increasing demand is costly. In addition, if the spectrum required by the demands of users is greater than the spectrum available to meet those demands, increasing infrastructure will not meet those demands.

To avoid the costs of adding infrastructure, and to help insure that the available spectrum will meet the demands placed upon it, service providers seek to use their available resources as efficiently as possible. One important aspect of efficient resource use is adapting signals to the devices to which they are being transmitted.

One mechanism for efficient use of resources is carrier aggregation. Many base stations may employ multiple carriers to provide coverage to a sector. For example, a base station may employ a 700 MHz carrier and a 2 GHz carrier, and a base station may be configured to transmit to a user device using both carriers. In addition, a user device may be within range of multiple base stations and can connect to a single carrier, multiple carriers from a single base station, or carriers from multiple base stations, in order to achieve a better peak rates and capacity. In third generation partnership project (3GPP) and 3GPP long term evolution (3GPP-LTE) networks, base stations may be implemented as eNodeBs (eNBs) and user devices may be referred to as user equipments (UEs).

Another mechanism for efficient use of resources employs beamforming, of which one useful approach is elevation beamforming. A base station may employ an antenna array, and signal components provided to each element of the array may be chosen so as to optimize signal gain for a particular UE.

SUMMARY

In one embodiment of the invention, a method comprises determining a first elevation beam for transmission to a user device using a first carrier, determining a second elevation beam for transmission to the user device using a second carrier, wherein the selection of the second elevation beam is based at least in part on information relating to selection of the first elevation beam, and configuring the first and second elevation beams for transmission to the user device.

In another embodiment of the invention, a method comprises receiving at least a first and a second signal transmitted from at least one base station, wherein each of the first and the second signal is transmitted using a separate carrier, and wherein each of the first and the second signal is transmitted using an elevation beam determined for transmission to a user device. The elevation beam used for transmitting the second signal is determined at least in part using information associated with the elevation beam used for transmitting the first signal.

In another embodiment of the invention, an apparatus comprises at least one processor and memory storing computer program code. The memory storing the computer program code is configured to, with the at least one processor, cause the apparatus to at least receive at least a first and a second signal transmitted from at least one base station, wherein each of the first and the second signal is transmitted using a separate carrier, and wherein each of the first and the second signal is transmitted using an elevation beam determined for transmission to a user device. The elevation beam used for transmitting the second signal is determined at least in part using information associated with the elevation beam used for transmitting the first signal.

BRIEF DESCRIPTION OF THE DRAWINGS

FIGS. 9A and 9B respectively illustrate gain and phase achieved by two pairs of elevation beams that may be determine using one or more embodiments of the present invention;

DETAILED DESCRIPTION

Embodiments of the present invention recognize that carrier aggregation and elevation beamforming may be combined, and that elevation information for a beam using one carrier may be used to provide elevation information for a beam using another carrier. In one or more embodiments of the invention, such an approach may be used for multiple carriers for a single eNB or carriers from multiple eNBs. Control of elevation may be performed, for example, by appropriately directing signal components to appropriate elements of an antenna array, and details of such elevation control may be found, for example, in U.S. patent application Ser. No. 13/586,284, filed 15 Aug. 2012, assigned to the assignee of the present invention and incorporated herein by reference in its entirety.

Figure 1:
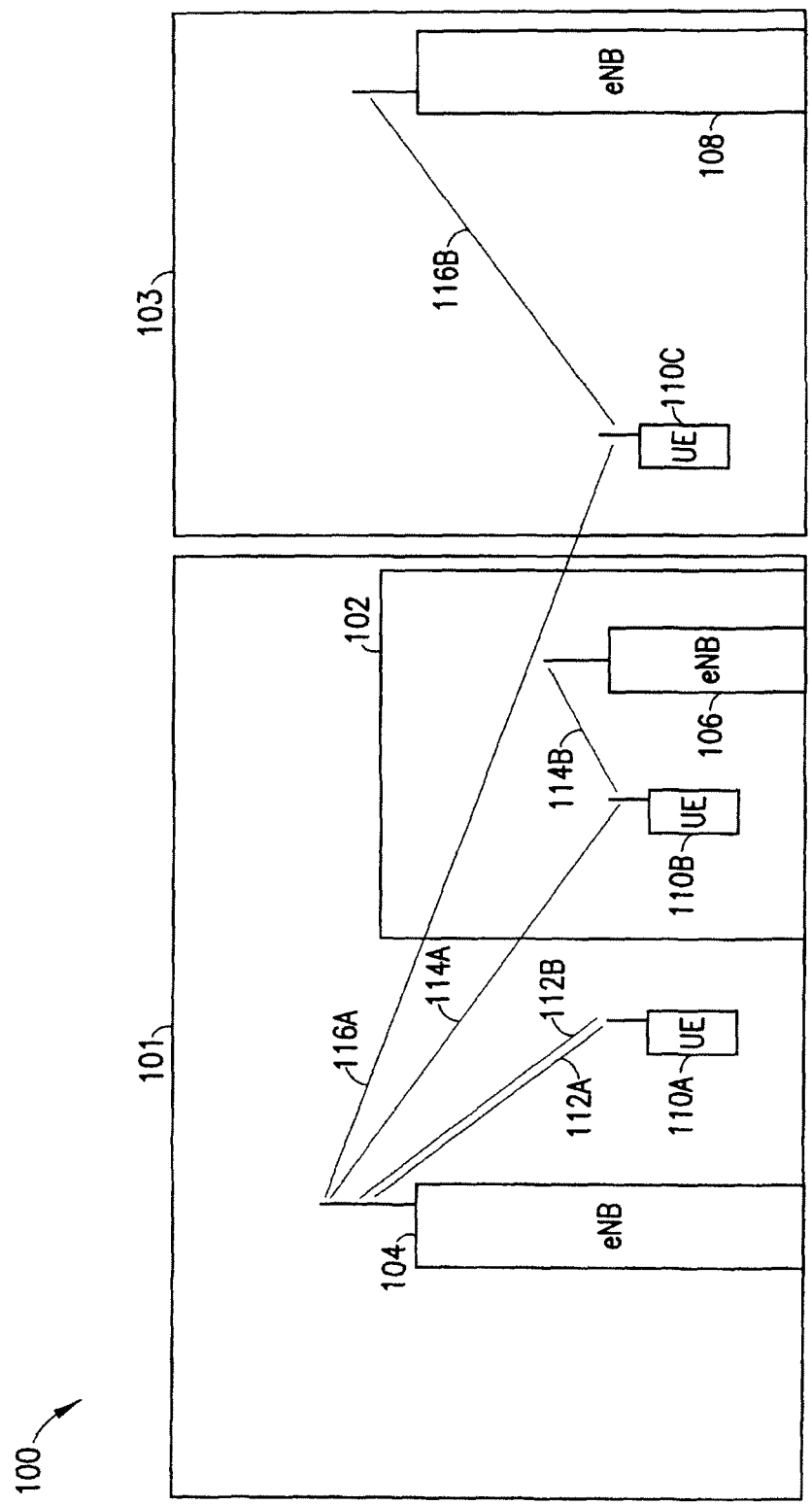
FIG. 1 illustrates a system according to an embodiment of the present invention.

FIG. 1 illustrates a network 100 comprising wireless network cells 101, 102, and 103. The cell 101 is served by a macro eNB 104 and the cell 102 lies within the cell 100 and is served by a pico eNB 106. The cell 103 is served by a macro eNB 108. UEs 110A-110C are distributed within the cells 101, 102, and 103, with each of the UEs 110A-110C receiving signals from one or more carriers, from one or more eNBs. The UE 110A receives signals 112A and 112B from the macro eNB 104, the UE 110B receives signals 114A and 114B from the macro eNB 104 and the pico eNB 106, respectively, and the UE 110C receives signals 116A and 116B from the macro eNBs 104 and 108, respectively. Each of the signals may be directed using elevation beamforming. Elevation beamforming requires some level of knowledge of the downlink channel between an eNB and a UE, and obtaining such knowledge usually involves some level of system overhead, such as feedback of channel state information. When a UE receives signals using multiple carriers, information used for determining beam elevation for one carrier may be used to determine beam elevation of another carrier.

In one embodiment the macro eNB 104 employs two carriers for signals 112A, 112B, and 114A, respectively, with the signals 112A and 112B using a first carrier (such as a 700 MHz carrier) and with the signal 114A using a second carrier (such as a 2 GHz carrier). In this embodiment the pico eNB 106 uses the first carrier (that is, the 2 GHz carrier) for the signal 114B.

In one or more embodiments of the invention, multiple UE-specific elevation beams used by a single eNB are selected for multiple carriers based on information related to one of the carriers. Such a selection may be made, for example, to choose the signals 112A and 112B.

Figure 2:
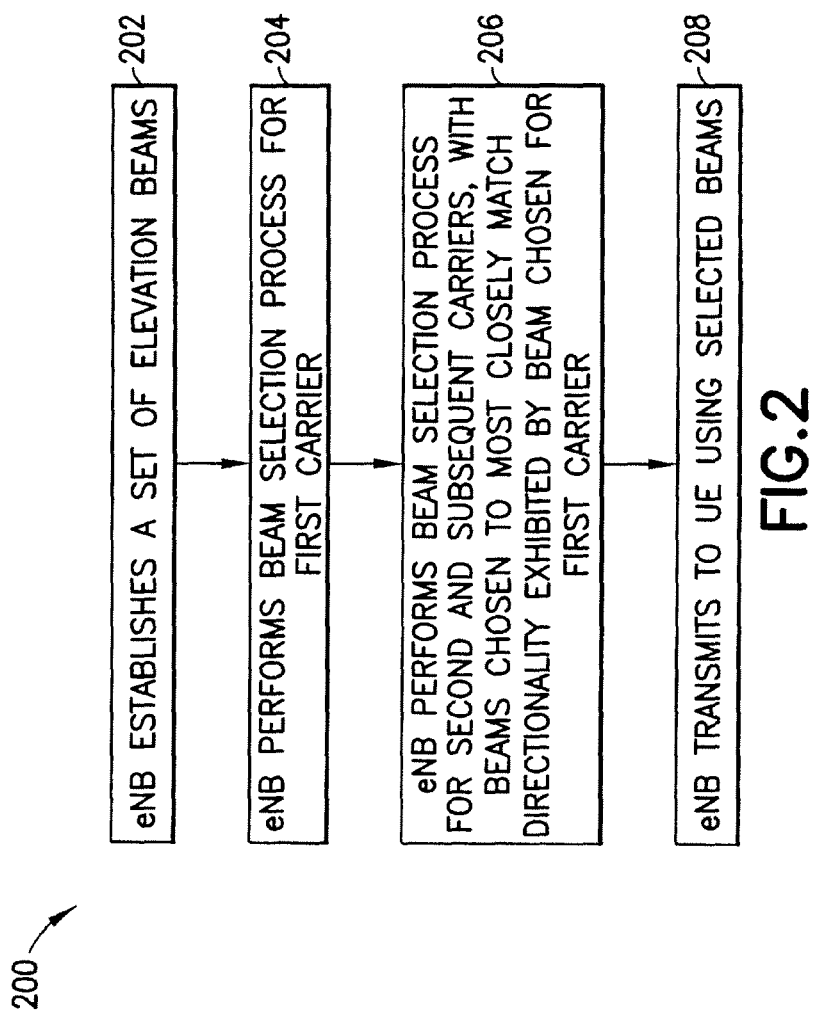
FIGS. 2-4 illustrate processes according to embodiments of the present invention.

FIG. 2 illustrates a process 200 according to an embodiment of the present invention. At step 202, a base station, such as the eNB 104, establishes a set of elevation beams, with a set of elevation beams being established for each of a plurality of carriers. The beams may suitably be quasi-non-overlapping, calibrated for directionality, where quasi-non-overlapping means that the beams exhibit a low correlation between them (where an example of such a low correlation is a correlation of less than approximately 0.1). One mechanism for such calibration is the use of a manifold calibrated array, and beams can be established at radio frequency or at baseband with calibrated hardware. The same beam elevations may be used for both carriers because of the calibration and the nature of the RF environment when the best elevation beam used at one carrier is very likely still the best elevation at the other carrier.

At step 204, a beam selection process may be performed for a first carrier. For example, a UE may measure a channel state information reference signal (CSI-RS) from each elevation port of the eNB and send back a precoding matrix indicator (PMI), rank indication (RI) and channel quality information (CQI), in a manner similar to that used in Dynamic Cell Selection (DCS) methodology. The feedback PMI then can be used by the eNB to determine the best elevation beam to use at the first carrier. This example mechanism for determining the elevation beam is suitable for either time division duplex (TDD) or frequency division duplex (FDD) operation. Another option for beam selection is to use the uplink signal in either a FDD or TDD system at one carrier to determine the best elevation beam to use at the first carrier.

At step 206, beam selection is performed for a second, and any subsequent, carrier used by the eNB. The second beam is chosen so as to most closely match the directionality exhibited by the best beam on the first carrier. The beam selection process of step 204 is not performed on the second and subsequent carriers; rather, the assumption is made that the best beam on the first carrier is the best beam on the other carriers. At step 208, the eNB transmits to the UE using the selected beams.

Figure 3:
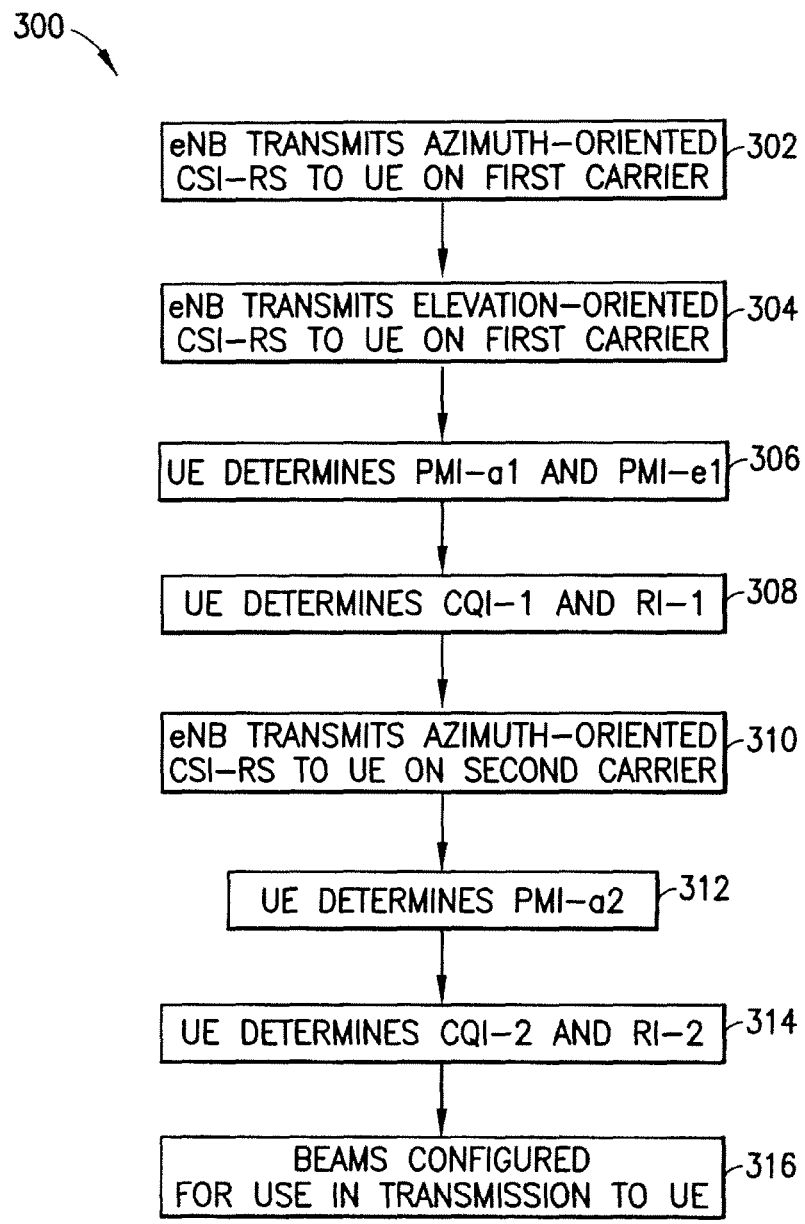

In another approach, computations for UE-specific elevation beamforming are performed based on a product codebook. A product codebook is a codebook of precoding matrices/vectors where the overall codebook has been split into two separate codebooks: for example, one for the elevation dimension and one for the azimuth dimension. An example product codebook is the 8 antenna codebook used in Release 10 of the Third Generation Partnership Project Long Term Evolution (3GPP LTE, or LTE) downlink. FIG. 3 illustrates a process 300 according to an embodiment of the present invention, performed by a macro cell (represented by an eNB, for example) using two carriers for communication with a UE. At step 302, the eNB transmits an azimuth-oriented channel state information reference signal (CSI-RS) to a UE on the first carrier, and at step 304, the eNB transmits elevation-oriented CSI-RS on the first carrier. (For a two-dimensional rectangular array at the eNB for example, an N1-port azimuth-oriented CSI-RS can be transmitted by first aggregating each column of the array with any of the well-known antenna aggregation techniques (such as random precoding, cyclic shift transmit diversity, etc.), and then transmitting the N1-port CSI-RS over the N1 aggregated antennas, where N1 is the number of antennas in azimuth in the eNB antenna array. Similarly an N2-port elevation-oriented CSI-RS can be transmitted by first aggregating each row of the array with any of the well-known antenna aggregation techniques, and then transmitting the N2-port CSI-RS over the N2 aggregated antennas, where N2 is the number of antennas in elevation in the eNB array.) At step 306, the UE determines, for the first carrier, azimuth and elevation precoding matrix indicator for the first carrier, suitably referred to as PMI-a1 and PMI-e1, respectively. PMI-a1 is determined through azimuth codebook selection for the first carrier and PMI-e1 is determined through elevation codebook selection for the first carrier. At step 308, the UE computes aggregated channel quality information (suitably referred to as CQI-1) and overall rank indication RI-1, based on PMI-a1 or a combination of PMI-a1 and PMI-e1.

At step 310, the eNB transmits an azimuth-oriented channel state information reference signal (CSI-RS) on a second carrier, and the UE subsequently performs computations for the second carrier. At step 312, the UE determines azimuth precoding matrix information for the second carrier, suitably referred to as PMI-a2. PMI-a2 may be determined through azimuth codebook selection for the second carrier.

At step 314, the UE determines aggregated channel quality information for the second carrier (CQI-2) and the rank indication for the second carrier (RI-2), suitably based on PMI-a2 or combination of PMI-a2 and PMI-e1. It will be noted that in this embodiment, the eNB does not send elevation-oriented CSI-RS on the second carrier, because a reasonable assumption is that PMI-e1 provides sufficient information to compute the needed information for the second carrier, provided that an antenna array used by the eNB is adequately calibrated between both carriers. Instead of specifically determining elevation-oriented values for the second carrier, the gain from elevation beamforming is predicted based on the PMI-e1 plus the elevation-oriented CSI-RS for the first carrier.

At step 316, beams appropriately directed in azimuth and elevation is configured for use in transmission to the UE, based on determinations such as those discussed above.

Figure 4:
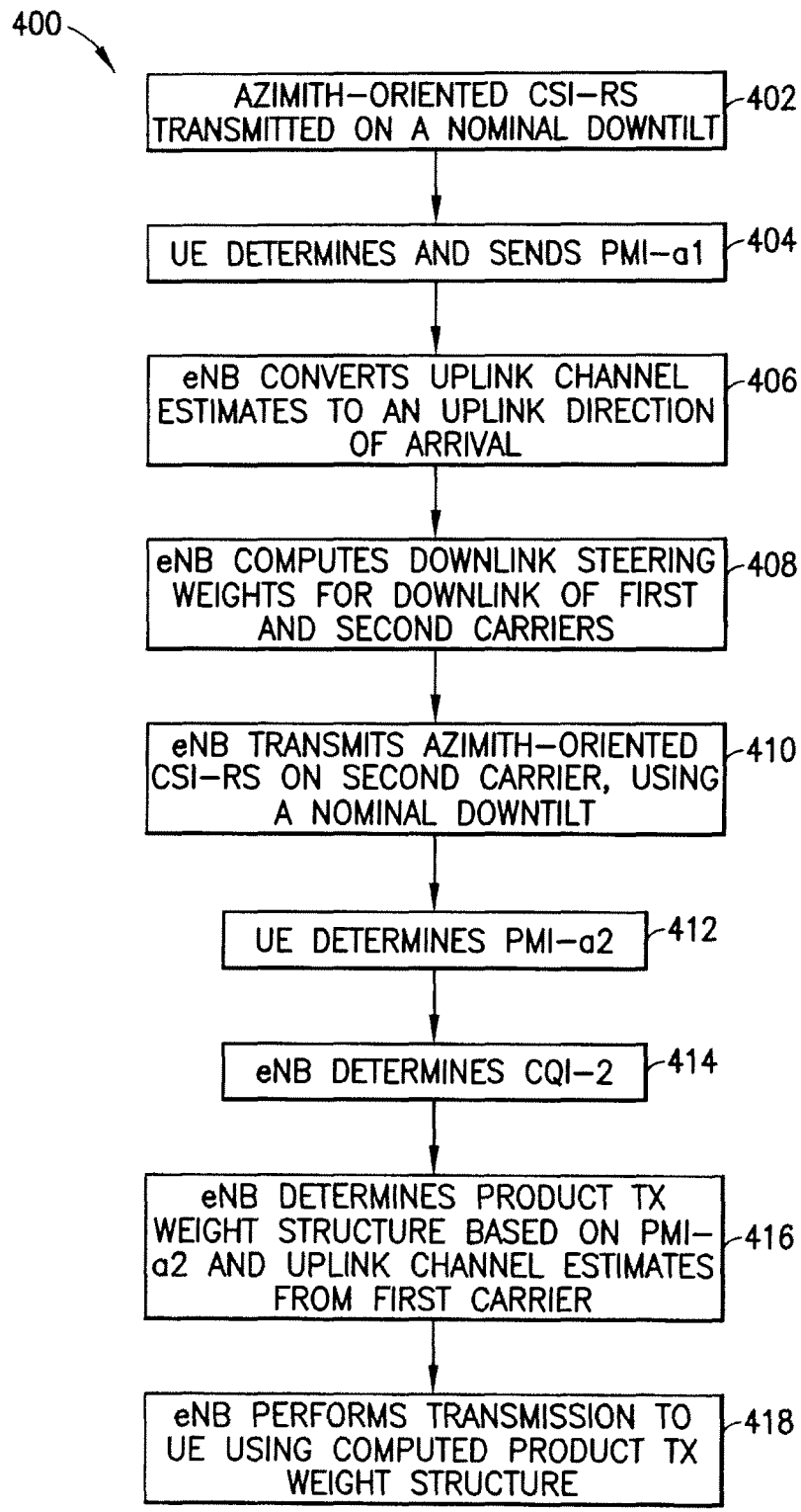

FIG. 4 illustrates a process 400 according to an embodiment of the invention, using PMI feedback to control azimuth and uplink reciprocity and translation to control elevation. At step 402, an eNB transmits an azimuth-oriented CSI-RS on a nominal downtilt on a first carrier. At step 404, the UE determines and sends azimuth-orientated feedback for the first carrier, PMI-a1. At step 406, the eNB converts uplink channel estimates to an uplink direction of arrival (DOA) in the elevation direction. At step 408, the eNB computes downlink steering weights for both the downlink of the first carrier and the downlink of the second carrier based on the DOA estimate (steering weights are a set of antenna weightings which maximize the transmit power from the elevation array in the direction given by the DOA).

Additional actions are undertaken to determine information relevant to a second carrier. At step 410, the eNB transmits an azimuth-oriented CSI-RS on the second carrier, using a nominal downtilt. For example, a nominal downtilt may be a pre-determined fixed downtilt such as 10 degrees. At step 412, the UE computes PMI-a2 based on the CSI-RS sent on the second carrier and sends PMI-a2 to the eNB. At step 414, the eNB predicts channel quality information (CQI-2) for the second carrier based on PMI-a2, PMI-a1, the steering weights on the second carrier, and also the uplink channel estimates.

At step 416, the eNB determines a product Tx weight structure based on the PMI-a2 and the steering vector for the second carrier. For example the product Tx weight could be the kronecker product of the PMI-a2 and steering vector for the second carrier. At step 418, the eNB performs transmission to the UE using the computed product TX weight structure.

One or more embodiments of the present invention provide simultaneous transmission from multiple transmission points to a single UE, such as a macro eNB and a pico eNB or from two macro eNBs. Simultaneous transmission from a macro and a pico eNB on two different carriers, such as carrier C1 from the macro eNB and carrier C2 from the pico eNB may be referred to as multi-flow transmission, while simultaneous transmission using the same carriers between macro eNBs or between macro and pico eNBs may be referred to as joint transmission cooperative multi-point transmission (JT-CoMP).

In another embodiment each of the macro and pico eNB uses two carriers C1 and C2. Carriers C1 and C2 are then aggregated at macro and pico cells and both the cells are transmit the aggregated flow to the UE. Such a mechanism may be referred to as carrier aggregation CoMP.

Figure 5:
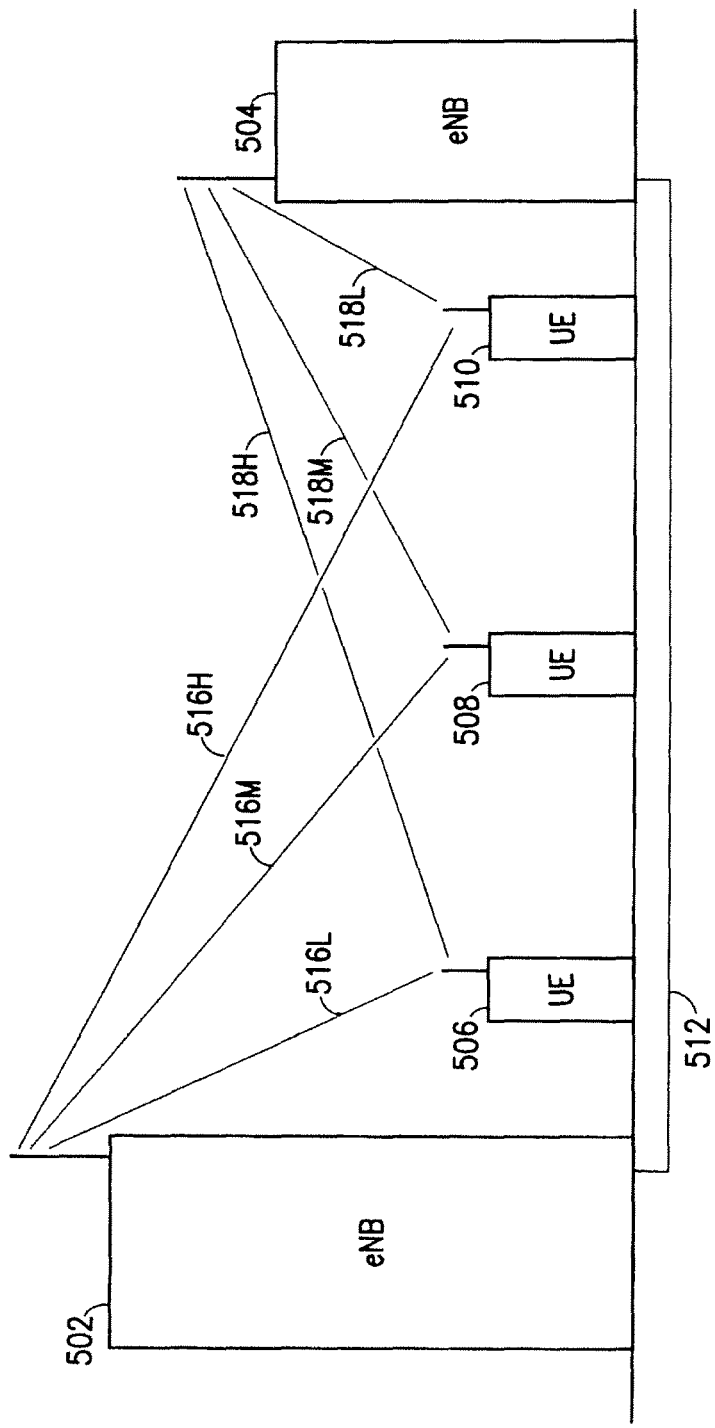
FIG. 5 illustrates a system according to an embodiment of the present invention.

FIG. 5 illustrates a macro eNB 502 and a pico eNB 504, serving UEs 506, 508, and 510. The macro eNB 502 and the pico eNB 504 may communicate using an X2 connection 512. In the present exemplary embodiment, the macro eNB 502 and the pico eNB 504 may select from high, medium and low beams (beam 516H, 516M, and 516L for the macro eNB and beam 518H, 518M, and 518L for the pico eNB).

The macro eNB 502 determines elevation information for the UE, and this elevation information guides selection of the appropriate beam for the pico eNB 504. The macro eNB 502 then sends the elevation information to the pico eNB 504, suitably through the X2 interface 514. The pico eNB 504 has information indicating its location with respect to the macro eNB 502 and is able to use the elevation information received from the macro eNB 502, together with knowledge of the distance between the macro eNB 502 and the pico eNB 504, to determine the best elevation beam needed for transmission to the UE. In the environment shown, transmissions at greater distances are best performed using higher elevation angles. The UE and transmissions at lesser distances are best performed using lower elevation angles. Thus, the macro eNB 502 transmits to the UE 506 using the beam 516L and the pico eNB transmits to the UE 506 using the beam 516H. The macro eNB 502 transmits to the UE 508 using the beam 516M and the pico eNB 504 transmits to the UE 508 using the beam 518M. The macro eNB 502 transmits to the UE 510 using the beam 516H and the pico eNB 504 transmits to the UE 508 using the beam 518L.

A similar approach may be used for JT-CoMP using multiple macro eNBs or other combinations of eNBs. One macro eNB, for example, may select a beam elevation for a UE and the other participating macro eNB or pico eNB receives the elevation information and uses that information, as well as previously known distance information, to determine its own best elevation to the same UE. Also a similar approach can be used when both the macro and pico eNB uses two carriers C1 and C2.

Figure 6:
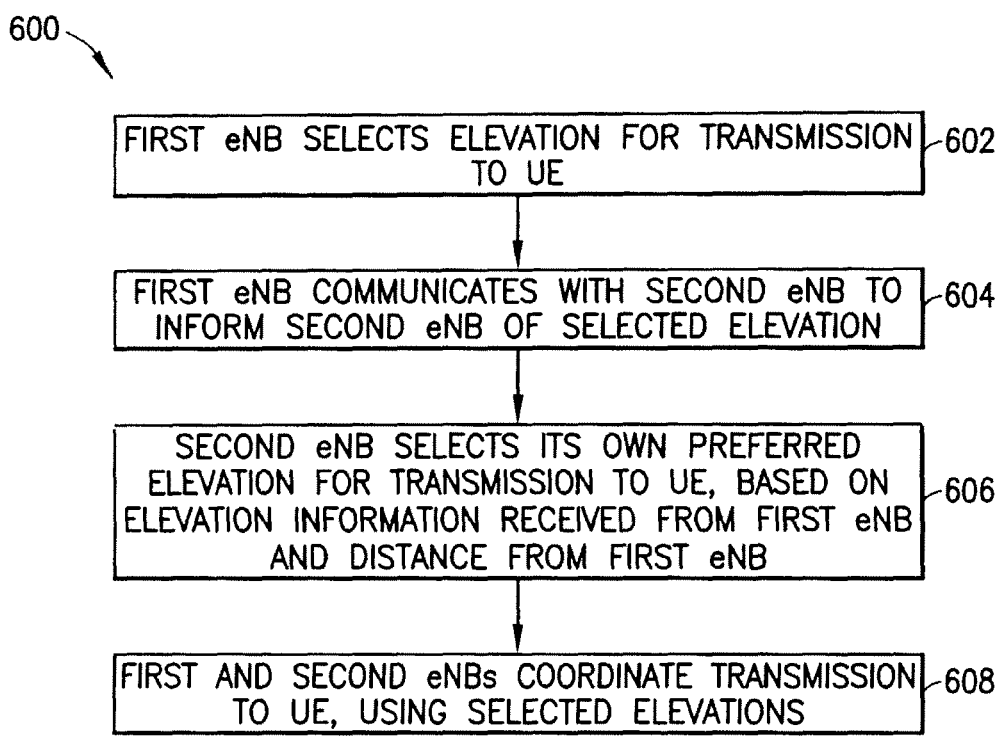
FIG. 6 illustrates a process according to an embodiment of the present invention.

FIG. 6 illustrates a process 600 of coordinated transmission from multiple eNBs according to an embodiment of the present invention. At step 602, a first eNB selects an elevation for transmission to a UE. At step 604, the first eNB communicates with a second eNB to inform the second eNB of the selected elevation. At step 606, the second eNB selects its own preferred elevation for transmission to the UE, based on the elevation information received from the first eNB and its distance from the first eNB. At step 608, the first and the second eNBs coordinate a transmission to the UE, using their selected elevations.

FIGS. 7-10 illustrate aspects of elevation beamforming that may be used to carry out embodiments of the present invention. An antenna array may comprise element pairs, with members of a pair exhibiting different polarizations, and appropriate signal components may be supplied to elements of an array, with appropriate phasing applied to components, to control elevation of signals transmitted by the array.

Figure 7:
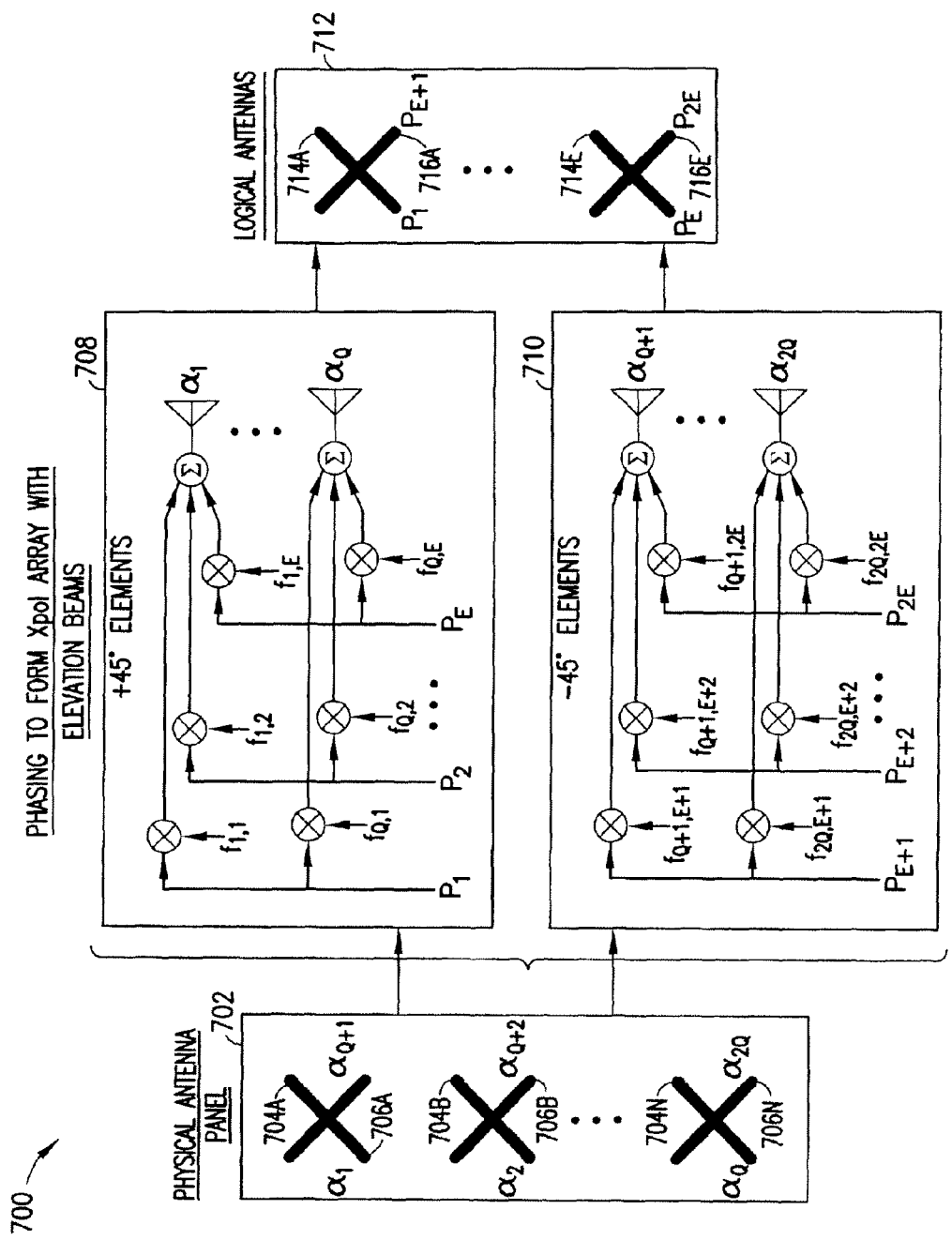
FIG. 7 illustrates an antenna array that may be used to perform carrier aggregated beamforming according to one or more embodiments of the present invention.

FIG. 7 illustrates an array 700 according to an embodiment of the present invention, comprising a physical antenna panel 702. The physical antenna panel 702 comprises pairs of elements 704A and 706A, 704B and 706B, on through 704N and 706N. The elements 704A, 704B, . . . , 704N may be designated as $\alpha_1, \alpha_2, \ldots, \alpha_Q$, respectively, and the elements 706A, 706B, . . . , 706N may be designated as $\alpha_{Q+1}, \alpha_{Q+2}, \ldots, \alpha_{2Q}$, respectively. The elements are subjected to phasing operations 708 and 710, designed to phase all antennas of the corresponding polarization. The signals $P_1, P_2, \ldots, P_E$, supplied to the +45-degree elements, are phased by the values $f_{1,1}$ through $f_{Q,1}$, $f_{1,2}$ through $f_{Q,2}, \ldots$, and $f_{1,E}$ through $f_{Q,E}$ respectively. The signals $P_{E+1}$, $P_{E+2}, \ldots, P_{2E}$, supplied to the −45-degree elements, are phased by the values $f_{Q+1,E+1}$ through $f_{2Q,E+1}$, $f_{Q+1,E+2}$ through $f_{2Q,E+2}, \ldots$, and $f_{Q+1,2E}$ through $f_{2Q,2E}$ respectively. The outputs of the phasing operations are summed to create logical ports 712, comprising logical pairs of elements 714A and 716A through 714E and 716E. Phasing between all antennas allows significant control over effective elevation and downtilt.

Figure 8:
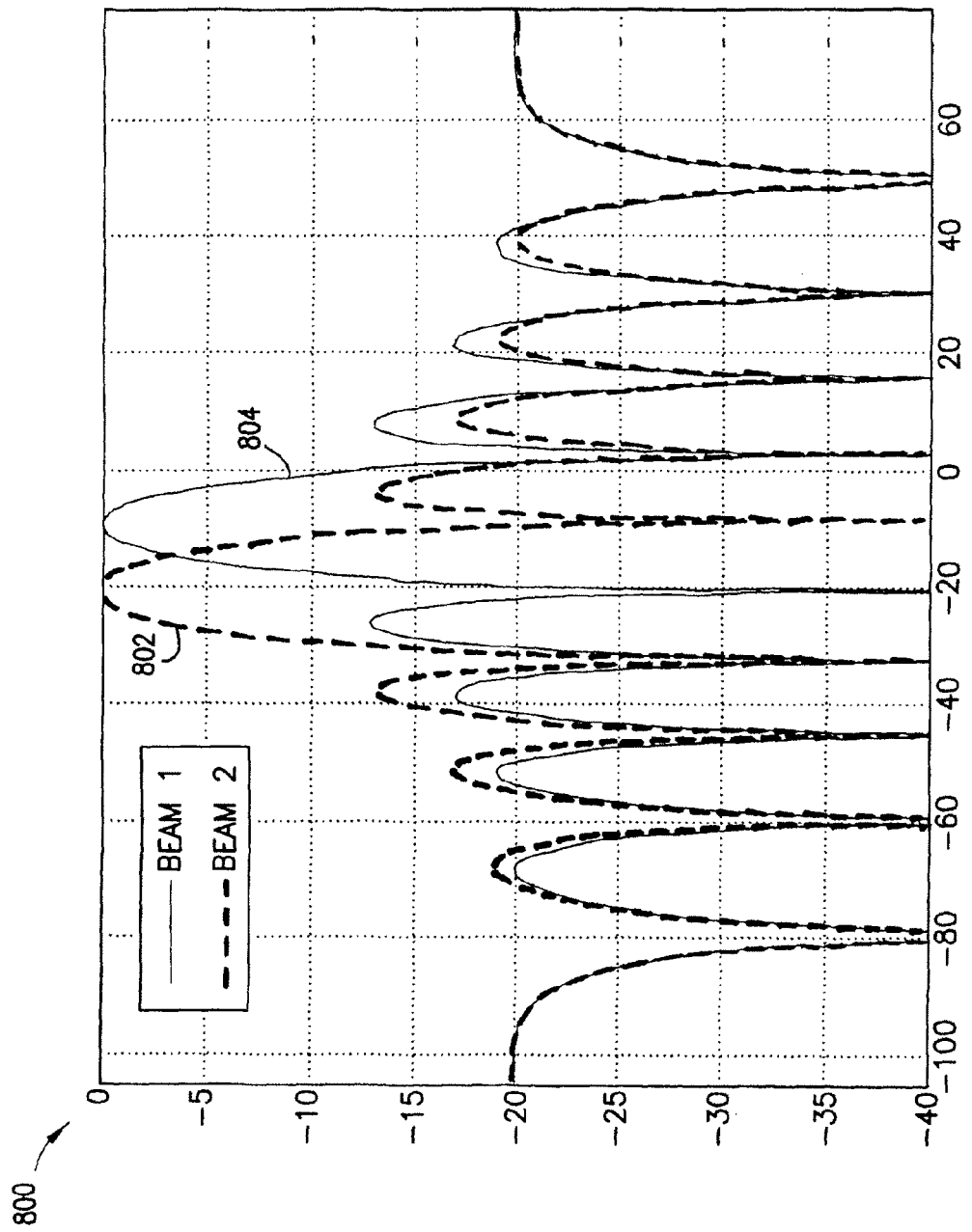
FIG. 8 illustrates a graph showing the relationship between normalized power and elevation angle, that may be used to inform operations according to one or more embodiments of the present invention.

FIG. 8 illustrates a graph 800 of the relation between normalized power and elevation angle, as presented by curves 802 and 804. In these curves an elevation angle of 0 is in the x-y plane and negative values are for elevation angles below the x-y plane. The curves 802 and 804 present the performance of exemplary first and second elevation beams (E=2 in FIG. 7), each formed from 10 vertical sub-elements (N=Q=10 in FIG. 7), with 15 degree nominal downtilt assumed (steered electrically at RF). The beams would be applied to two polarizations as shown in FIG. 7 to form E=2 elevation ports per polarization. The elevation beams form antenna ports in the elevation dimension that can be used to control the elevation dimension through the use of the aforementioned codebook feedback procedures.

Figure 9B:
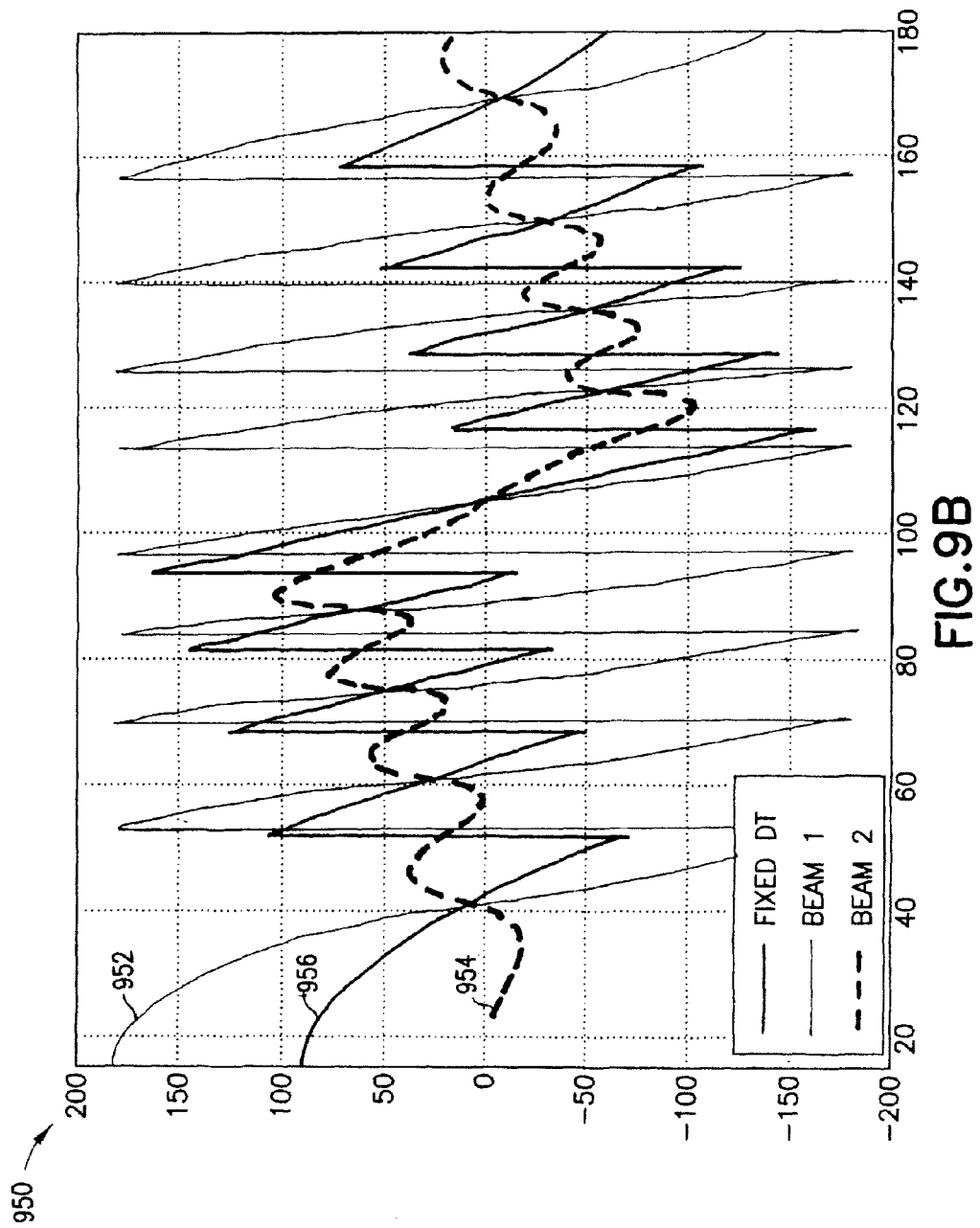

FIGS. 9A and 9B illustrate gain and phase, respectively, of another exemplary pair of two elevation beams, which may be viewed as being transmitted from two effective elevation ports (in these curves 90 degrees is in the x-y plane and angles greater than 90 degrees are below the x-y plane). The E=2 beams are created by weighting N=Q=10 vertically arranged half-wavelength spaced physical sub-elements within a panel array (again these beams would be applied to both polarizations in the array). FIG. 9A illustrates a graph 900 presenting curves 904 and 906, representing gain versus elevation angle for first and second elevation beams. The curves 904 and 906 illustrate gain relative to that for a fixed downtilt (DT), and the gain for a fixed downtilt is presented by a curve 902 representing gain versus elevation angle for the fixed downtilt. FIG. 9B illustrates a graph 950 of phase versus elevation angle for first and second elevation beams, with the curves 952 and 954 presenting the phase versus elevation angle for the first and second beams, respectively, relative to a fixed downtilt, represented by the curve 956 showing phase versus elevation angle for the fixed downtilt.

Figure 10:
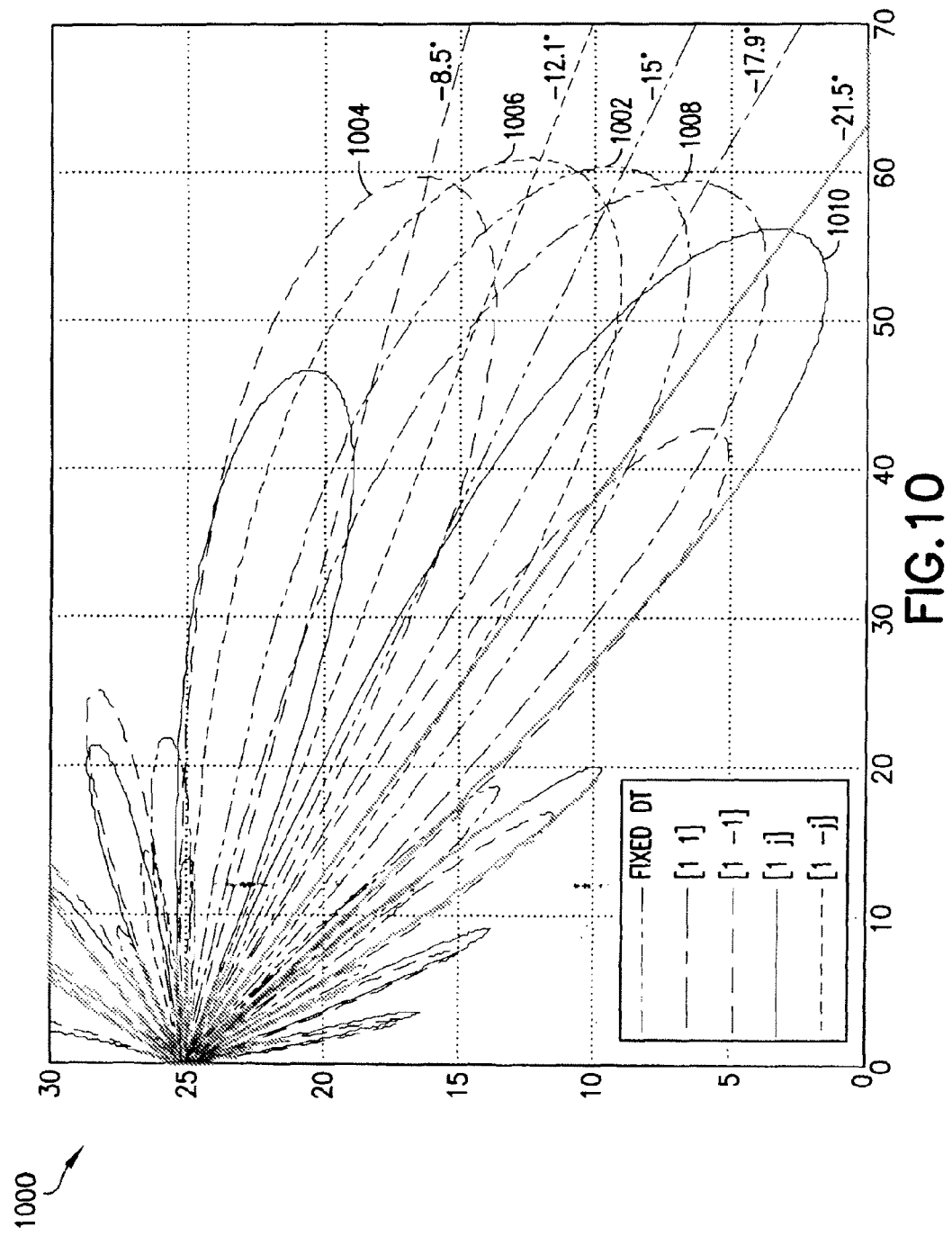
FIG. 10 illustrates elevation beams that may be determined using one or more embodiments of the present invention.

FIG. 10 illustrates a graph 1000 showing the result of control of elevation beamspace weights using two elevation ports, co-phased with a 2×1 elevation beamforming weight vector, taken from the long term evolution (LTE) 2-antenna codebook. The graph 1000 presents a pattern plotting beam power in dB against distance from a transmitting eNB, for a fixed 15-degree downtilt represented by the curve 1002 (in these plots 0 degrees is assumed to be in the x-y plane and negative angles are for elevations below the x-y plane). The curve 1004 represents the result of an 8.5-degree downtilt, achieved with [1 −1] co-phasing, the curve 1006 represents the result of a 12.1-degree downtilt, achieved with [1 −j] co-phasing, the curve 1008 represents the result of a 17.9-degree downtilt, achieved with [1 1] co-phasing, and the curve 1010 represents the result of a 21.5-degree downtilt, achieved with [1 j] co-phasing.

Embodiments of the present invention recognize that elevation beamforming provides a way to steer beams in three dimensions, using both azimuth and elevation, through appropriate control of panel arrays such as those described above. Utilizing the additional dimension provides for improved beamforming gains.

Embodiments of the present invention further recognize that fixed weight vectors need not be used to control elevation and that the use of fixed weight vectors can reduce gains that could otherwise be achieved. Embodiments of the invention therefore provide for control of elevation using weight vectors and phase values chosen to optimize performance.

Figure 11:
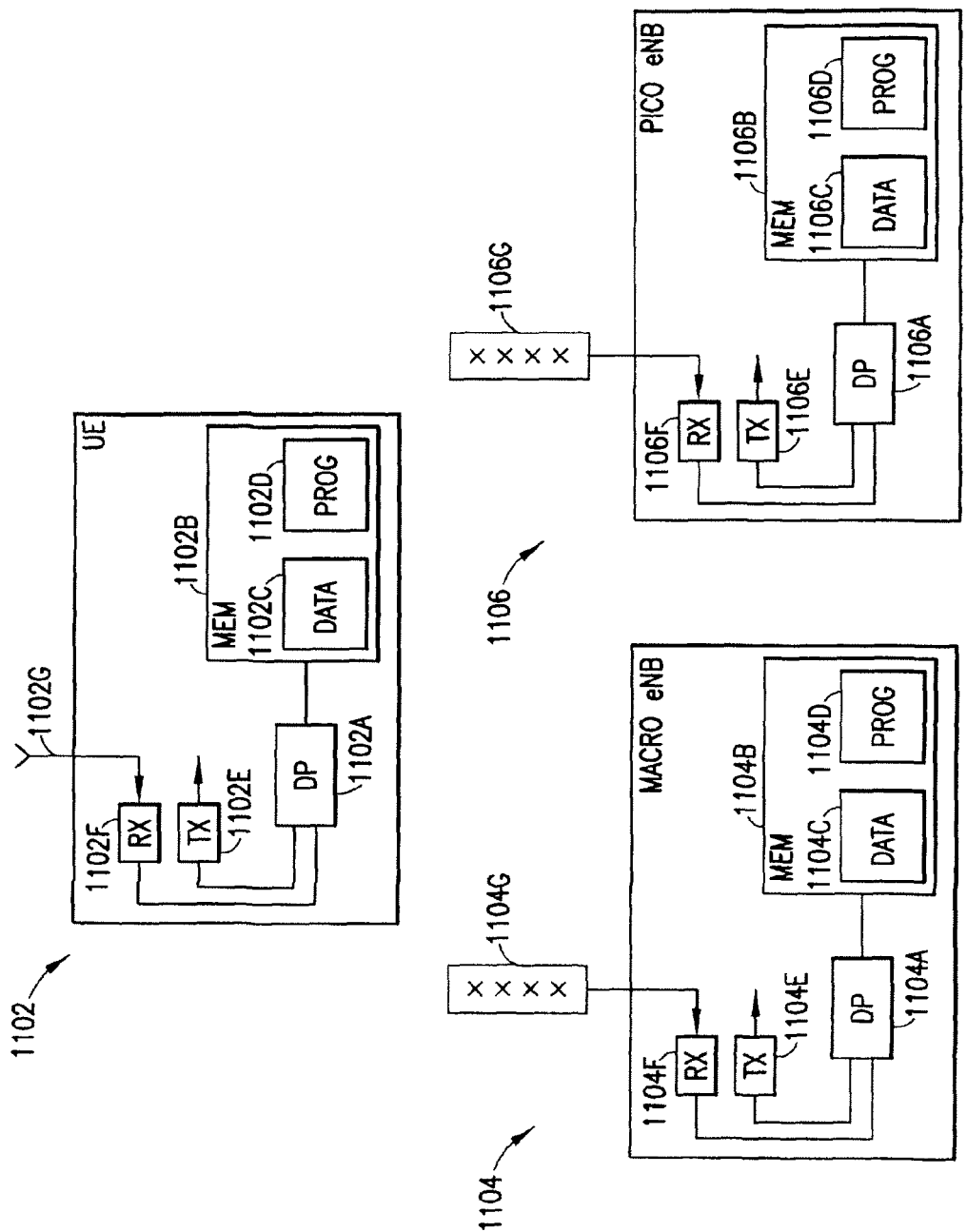
FIG. 11 illustrates elements according to an embodiment of the present invention.

FIG. 11 illustrates exemplary network elements according to an embodiment of the present invention. Elements include a UE 1102, a macro base station, implemented as a macro eNB 1104, and a pico base station, implemented as a pico eNB 1106. The UE 1102 comprises a data processor 1102A and memory 1102B, with the memory 1102B suitably storing data 1102C and software 1102D. The UE 1102 further comprises a transmitter 1102E, receiver 1102F, and antenna 1102G. Similarly, the macro eNB 1104 comprises a data processor 1104A, memory 1104B, with the memory 1104B suitably storing data 1104C and software 1104D. The macro eNB 1104 also comprises a transmitter 1104E, receiver 1104F, and antenna array 1104G. The pico eNB 1106 comprises a data processor 1106A and memory 1106B, with the memory 1106B suitably storing data 1106C and software 1106D. The pico eNB 1106 also comprises a transmitter 1106E, receiver 1106F, and antenna array 1106G. At least one of the software 1102C-1106C stored in memories 1102B-1106B is assumed to include program instructions (software (SW)) that, when executed by the associated data processor, enable the electronic device to operate in accordance with the exemplary embodiments of this invention. That is, the exemplary embodiments of this invention may be implemented at least in part by computer software executable by the DP 1102A-1106A of the various electronic components illustrated here, with such components and similar components being deployed in whatever numbers, configurations, and arrangements are desired for the carrying out of the invention. Various embodiments of the invention may be carried out by hardware, or by a combination of software and hardware (and firmware).

The various embodiments of the UE 1102 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memories 1104B-1106B may be of any type suitable to the local technical environment and may be implemented using any suitable data storage technology, such as semiconductor based memory devices, flash memory, magnetic memory devices and systems, optical memory devices and systems, fixed memory and removable memory. The data processors 1102A-1106A may be of any type suitable to the local technical environment, and may include one or more of general purpose computers, special purpose computers, microprocessors, digital signal processors (DSPs) and processors based on multi-core processor architectures, as non-limiting examples.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. A method comprising:
receiving an uplink signal from a device using a third carrier of at least first, second, and third carriers;
determining an elevation direction of arrival from the uplink signal;
determining, from the elevation direction of arrival, a first elevation beam for transmission to a user device using the first carrier;
determining, from the elevation direction of arrival, a second elevation beam for transmission to the user device using the second carrier; and
configuring, using carrier aggregation, the first and second elevation beams by configuring the first and second elevation beams to overlap while avoiding interference through the use of separate carriers.

2. The method of claim 1, wherein the first and second elevation beams are selected from a set of elevation beams.

3. The method of claim 2, wherein a beam selection is performed on the first carrier based at least in part on channel information received from the user device and wherein the second elevation beam is a closest match to a directionality of the first elevation beam.

4. The method of claim 1, wherein the first and second elevation beams are determined based at least in part on a precoding matrix indicator computed by the user device, wherein the precoding matrix indicator comprises a precoding matrix indicator for the first carrier based at least in part on an elevation-oriented channel state information reference signal for the first carrier.

5. The method of claim 1, wherein the first elevation beam is determined as a steering vector for the elevation direction of arrival at a frequency of the first carrier, and wherein the second elevation beam is determined as a steering vector for the elevation direction of arrival at a frequency of the second carrier.

6. The method of claim 1 wherein the third carrier is the same as the first carrier.

7. The method of claim 1, wherein a transmission to the user device on the second carrier is based, at least partially, upon receiving an azimuth-orientated precoding matrix indicator from the user device for the second carrier and computing a transmit weight for the transmission to the user device on the second carrier which is a Kronecker product of a codebook matrix associated with an elevation-orientated precoding matrix indicator for the first carrier and a codebook matrix associated with the azimuth-orientated precoding matrix indicator for the second carrier.

8. The method of claim 1, wherein a transmission to the user device on the second carrier includes computing a transmit weight for a transmission to the user device on the second carrier which is a Kronecker product of a steering vector for the second carrier and a codebook matrix associated with an azimuth-orientated precoding matrix indicator for the second carrier.

9. The method of claim 1, wherein the first elevation beam is determined for a first base station and the second elevation beam is determined for a second base station, and wherein the second elevation beam is determined based at least in part on elevation information associated with the first elevation beam.

10. The method of claim 9, wherein the second elevation beam is further determined based at least in part on a distance between the first base station and the second base station.

11. The method of claim 9, wherein the elevation information associated with the first elevation beam is communicated from the first base station to the second base station.

12. A method comprising:
receiving at least first and second signals transmitted from at least one base station, wherein the first and second signals are transmitted using separate carriers, and, respectively, transmitted using first and second elevation beams determined for transmission to a user device;
wherein the first and second elevation beams are determined from an elevation direction of arrival determined from an uplink signal sent from the user device to one of the at least one base station; and
wherein the first and second elevation beams are configured using carrier aggregation by configuring the first and second elevation beams to overlap while avoiding interference through the use of the separate carriers.

13. The method of claim 12, wherein the first elevation beam is determined at least in part using channel information measured by the user device.

14. The method of claim 13, wherein the channel information measured by the user device is an elevation-oriented channel state information reference signal received on the first carrier from the base station transmitting the first signal and wherein the second elevation beam is determined based at least in part on information provided by the user device to the base station transmitting the second signal based on the elevation-oriented channel state information reference signal received on the first carrier.

15. The method of claim 12, wherein the user device provides the base station transmitting the first signal with an elevation-oriented precoding matrix indicator for the first carrier.

16. An apparatus comprising:
at least one processor;
at least one non-transitory memory storing computer program code;
wherein the memory storing the computer program code is configured to, with the at least one processor, cause the apparatus to at least:
receive at least first and second signals transmitted from at least one base station, the first and the second signals being transmitted using separate carriers, and, respectively, transmitted using the first and second elevation beams determined for transmission to a user device, wherein the first and second elevation beams are configured using carrier aggregation for transmission to the user device, by configuring the first and second elevation beams to overlap while avoiding interference through the use of the separate carriers; and
wherein the first and second elevation beams are determined from an elevation direction of arrival determined from an uplink signal sent from the user device to one of the at least one base station.

17. The apparatus of claim 16, wherein the first elevation beam is determined at least in part using channel information measured by the user device.

18. The apparatus of claim 17, wherein the channel information measured by the user device is an elevation-oriented channel state information reference signal received on a first carrier from the base station transmitting the first signal and wherein the second elevation beam is determined based at least in part on information provided by the user device to the base station transmitting the second signal based on the elevation-oriented channel state information reference signal on the first carrier.

19. The apparatus of claim 16, wherein the user device provides the base station transmitting the first signal with an elevation-oriented precoding matrix indicator for the first carrier.

20. A method comprising:
receiving an uplink signal from a user device using one carrier;
determining an elevation direction of arrival from the uplink signal;
determining, from the elevation direction of arrival, a first elevation beam for transmission to a user device using a first carrier;
determining, from the elevation direction of arrival, a second elevation beam for transmission to the user device using a second carrier, wherein the selection of the second elevation beam is based at least in part on information relating to selection of the first elevation beam; and configuring the first and second elevation beams for transmission to the user device.

21. A method comprising:

receiving at least a first and a second signals transmitted from respective first and second base stations, the first and the second signals is are transmitted using respective first and second carriers, and the first and second signals is are transmitted using respective first and second elevation beams determined for transmission to a user device;

wherein the first elevation beam is determined at least in part using an elevation-oriented channel state information reference signal that is measured by the user device and received on the first carrier from the first base station;

wherein the second elevation beam is determined at least in part on information provided by the user device to the second base station based on the elevation-oriented channel state information reference signal.

22. An apparatus comprising:

at least one processor;

at least one non-transitory memory storing computer program code; wherein the memory storing the computer program code is configured to, with the at least one processor, cause the apparatus to at least:

receive at least a first and a second signal transmitted from at least one base station, wherein each of the first and the second signal is transmitted using a separate carrier, and wherein each of the first and the second signal is transmitted using respective first and second elevation beams determined for transmission to a user device;

wherein the first elevation beam is determined at least in part using channel information measured by the user device;

wherein the second elevation beam is determined at least in part using information associated with the first elevation beam.

* * * * *